Nov. 3, 1925
1,560,250
I. H. LEVIN
ELECTROLYTIC CELL
Original Filed Oct. 4, 1921    2 Sheets-Sheet 1
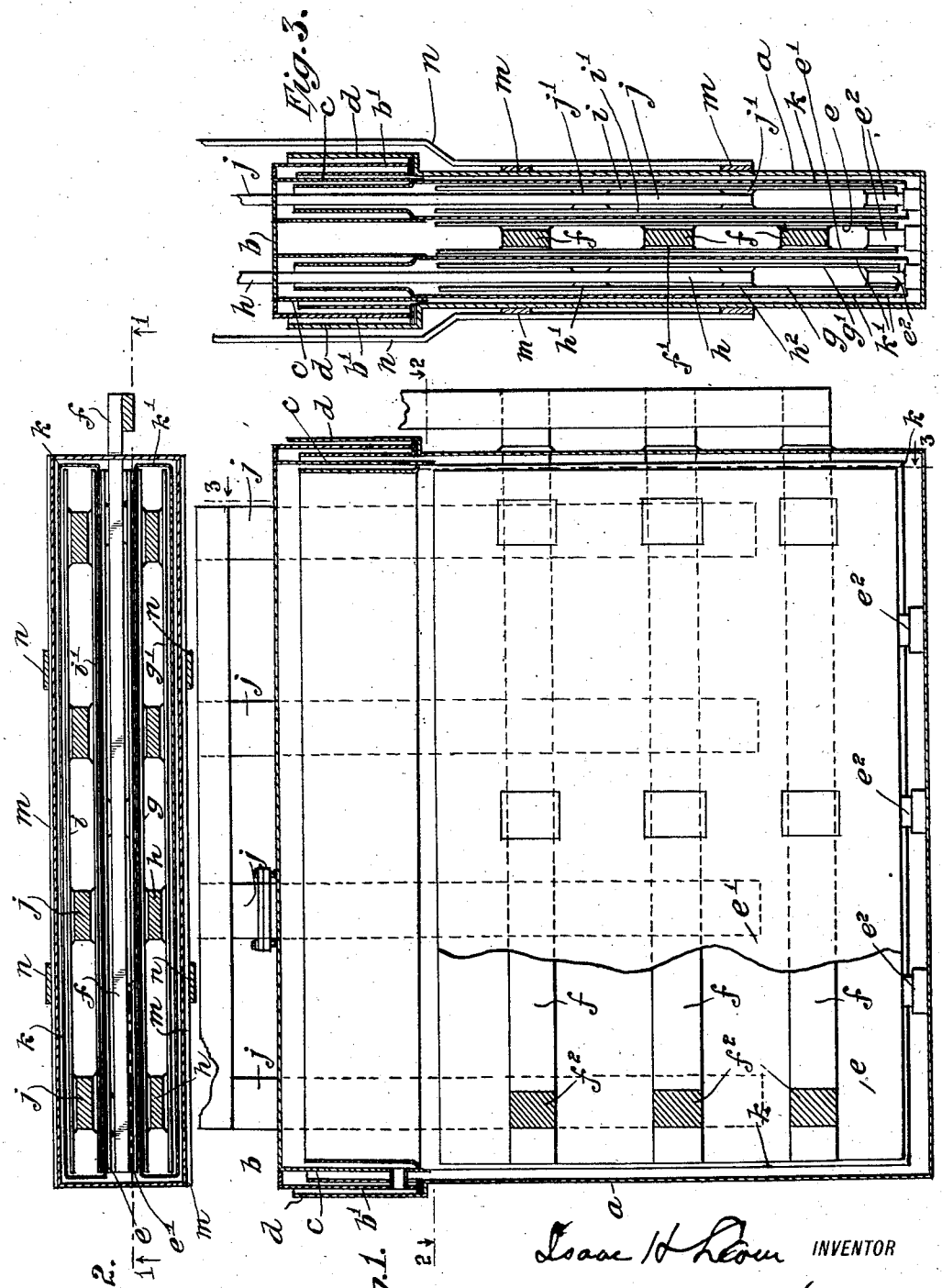
Isaac H. Levin INVENTOR
Frank P. Wentworth
his ATTORNEY.

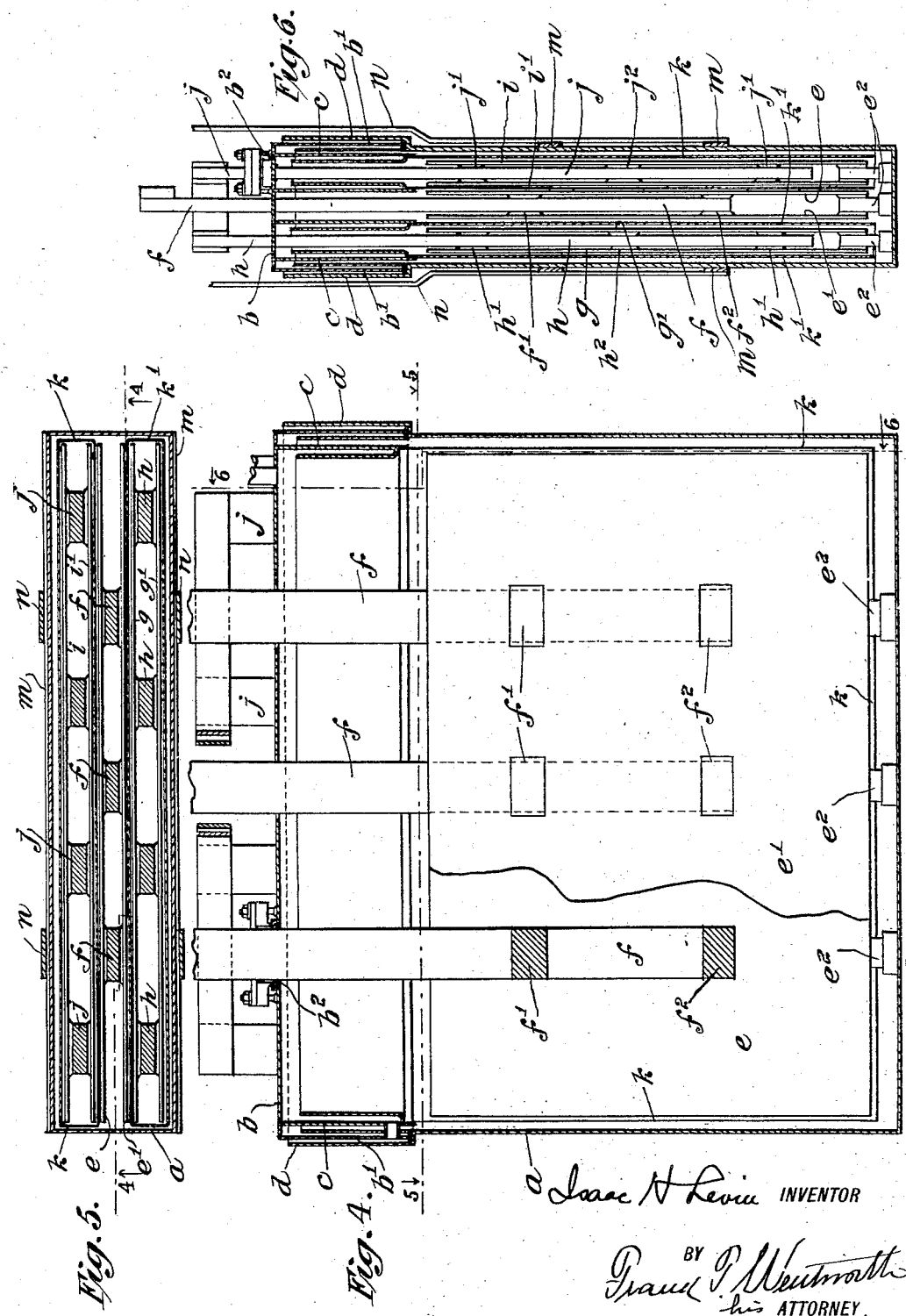

Patented Nov. 3, 1925.

1,560,250

UNITED STATES PATENT OFFICE.

ISAAC H. LEVIN, OF NEW YORK, N. Y., ASSIGNOR, BY MESNE ASSIGNMENTS, TO GAS INDUSTRIES COMPANY, OF PITTSBURGH, PENNSYLVANIA, A CORPORATION OF PENNSYLVANIA.

ELECTROLYTIC CELL.

Application filed October 4, 1921, Serial No. 505,302. Renewed May 12, 1925.

*To all whom it may concern:*

Be it known that I, ISAAC H. LEVIN, a citizen of the United States, residing at the borough of Manhattan, in the city, county, and State of New York, have invented certain new and useful Improvements in Electrolytic Cells, of which the following is a specification, reference being had therein to the accompanying drawings, which form a part thereof.

My invention relates to electrolytic cells, and more particularly to that type of unipolar cell wherein the container or tank for the electrolyte forms an electrode of one polarity, and a plurality of connected electrolyte chambers are formed by a dividing partition, each electrolyte compartment having an electrode therein of opposite polarity to the tank and to the partition.

In cells of the type to which my invention relates, it has been the custom heretofore to divide the container or tank by means of a partition spaced away from the bottom of the tank but merging into, and being mechanically and electrically connected with, opposite walls of the tank. By this construction the partition receives its electrical charge through the medium of the tank as a conductor, the result being current loss due to the high resistance of this partition and a loss in output capacity due to an inability to secure an effective distribution of the current throughout the entire partition.

I have heretofore filed an application for Letters Patent upon a cell of this type wherein each of the electrodes upon opposite sides of this partition are formed of oppositely disposed plates having terminal bars positioned between the plates and mechanically and electrically connected therewith at points well within the edges of the plates, thus permitting the use of terminal bars having sufficient cross-sectional area to offer low resistance to the current, while limiting the length of the path through which the current must flow to different portions of the plate, to secure an effective uniform distribution thereof throughout the plate to an extent to compensate for and permit the use of plates of a thinness which would normally offer high resistance to the current.

I have demonstrated that, by the extension of this principle to the partition dividing the container or tank, I may materially increase the efficiency of a tank used as an electrode and having a partition therein dividing this tank into separate electrolyte chambers.

I also so construct the terminals for the tank as to secure an effective distribution of the current throughout same particularly as to the surfaces opposite those of the electrodes of opposite polarity.

The invention consists primarily in an electrolytic cell embodying therein a container or tank for the electrolyte forming an electrode, closure means for the top of said tank, a partitioning electrode dividing said tank into two communicating electrolyte compartments, said tank and said electrode being of the same polarity, independent terminal bars carried by said tank and said partitioning electrode, inner electrodes of opposite polarity to said tank and said partitioning electrode arranged upon opposite sides of said partitioning electrode and between same and the wall of said tank, means co-operating with said closure means for preventing the commingling of gases adjacent the top of the cell, and diaphragms extending from said last named means within said compartment and about each of said inner electrodes; and in such other novel features of construction and combination of parts as are hereinafter set forth and described, and more particularly pointed out in the claims hereto appended.

Referring to the drawings,

Fig. 1 is a vertical section through a cell embodying my invention, with one of the plates of the partitioning electrode broken away;

Fig. 2 is a section on the line 2—2 of Fig. 1;

Fig. 3 is a section on the line 3—3 of Fig. 1;

Fig. 4 is a view similar to Fig. 1, showing a different embodiment of the invention;

Fig. 5 is a section on the line 5—5 of Fig. 4; and

Fig. 6 is a section on the line 6—6 of Fig. 4.

Like letters refer to like parts throughout the several views.

In both embodiments of the invention shown in the drawings, I employ a tank *a* which may be of any desired configuration to give the proper location and present an effective surface area to an opposed inner electrode.

Said tank is provided with closure means $b$ forming a gas-tight joint about the top of the tank, means being provided which co-operate with said closure means in forming two non-communicating chambers adjacent the top of the tank, said means in the form of the invention shown comprising baffles $c$ carried by said cover and extending below the normal level of the electrolyte in the tank. Since the invention relates to a multiple unit cell construction, I provide two such baffles, one arranged above each inner electrode in a manner which will more fully appear hereinafter.

In the form of the invention shown, the sealing of the closure means is secured by means of an hydraulic joint formed by a trough $d$ about the top of the tank $a$ into which projects a flange $b'$ of the cover or closure means $b$.

The characteristics above referred to are old and well known in this art and may take any desired form, as such are immaterial to the invention.

It is also essential in cells of this construction to provide circulating means for the electrolyte adjacent the top of the tank $a$, a showing of which, however, is not made in the drawings, as various different methods of circulating the electrolyte at this point may be employed, and this particular characteristic is immaterial to the present invention.

The cover or closure means $b$ is insulated from the tank $a$ and carries no current, which is the practice usually followed for simplifying the insulation of the terminals of the inner electrodes.

The tank $a$ as shown in the drawings, has long parallel side walls having large surface areas, and short end walls of relatively smaller areas.

Heretofore in this art the tank $a$ was divided into two communicating electrolyte chambers by means of a partition electrically and mechanically connected with opposite end walls, said partition ordinarily terminating below the top of the tank so as to not engage the cover and above the bottom of the tank so as to permit electrolyte to flow freely from one side thereof to the other side thereof adjacent the bottom of the tank. With this construction the partition forms an electrode of the same polarity as the tank proper and draws its current supply from the tank. As a consequence the path of the current with which the partitioning electrode is charged is sufficiently long to cause the partition, which is of small cross-sectional area, to offer high resistance to the flow of the current, thus causing a material voltage drop in charging the partition and causing an unequal distribution of the current throughout same with a resultant lowering both of the electrical efficiency and the capacity output of the cell.

In my present invention, I obviate the difficulties above referred to by so constructing the partition as to supply current thereto by means of a terminal bar or bars independent of those supplying current to the tank $a$, it being preferable to connect said bar or bars well within the edges of the partition so as to substantially equalize the resistance of the current to all parts of the partition and thus lower the resistance of the partition in its entirety.

While, for structural reasons, particularly in the form of the invention shown in Figs. 4 to 6, it is desirable that the partition and its terminal bars shall not be in electrical engagement with the tank $a$, the operative effect will be the same if either said partition or its terminal bar is in such contact as shown in Figs. 1 to 3 of the drawings, wherein the terminal bars will have the operative effect of feeder lines establishing uniform potential of the tank and the partitioning electrode.

In each form of the invention shown, the partitioning electrode consists of parallel electrode plates $e$—$e'$ having positioned between same a terminal bar or bars $f$ which are in mechanical and electrical connection with said plates at isolated points $f'$—$f^2$ well within the edges of the plates $e$—$e'$. The plates $e$—$e'$ may be supported from the bottom of the tank by suitable insulators $e^2$, or may be electrically connected therewith, as desired, the construction being such as to permit the circulation of electrolyte from one side of said partitioning electrode to the other side thereof adjacent the bottom of the tank $a$.

In the form of the invention shown in Figs. 1 to 3, the tank $a$ is provided with openings in an end wall thereof through which the terminal bars $f$ project so as to facilitate the connection of these bars with a bus bar. Since these openings are below the normal level of the electrolyte in the cell, it is essential that a liquid-proof joint be formed about them and the tank, which joint, as shown in Figs. 1 to 3 is formed by welding the bars to the tank wall.

In the form of the invention shown in Figs. 4 to 6, instead of bringing the terminal bars through an end wall, I bring the terminal bars upwardly and pass them through openings in the cover or closure means $b$, said openings being of relatively greater dimensions than the terminal bars so as to permit the use of any desired form of insulating packing $b^2$ about the bars to prevent short-circuiting of the cell through the cover and the terminal bars of the inner electrodes.

In the form of the invention shown, I employ a plurality of inner electrodes upon opposite sides of the partitioning electrode $e-e'$, the electrode between the plate $e$ and the opposed inner wall of the tank $a$ being composed of plates $g-g'$ having terminal bars $h$ between same and mechanically and electrically connected therewith well within the edges of the plates so as to ensure substantial uniform distribution of the current throughout the plates and minimize resistance thereof.

The terminal bar or bars $h$ are shown as each being connected with the plates $g-g'$ at a plurality of points $h'-h^2$.

The inner electrode between the plate $e'$ and the opposed wall of the tank $a$ is composed of plates $i-i'$ similar to the plates $g-g'$ and provided with terminal bars $j$ connected with said plates in a manner similar to that employed in connecting the terminal bars $h$ to the plates $g-g'$, the points of electrical contact being shown at $j'-j^2$.

In both forms of the invention shown, the terminal bar or bars $f$ and $h$ project through openings in the cover or closure means $b$ provided with the usual of any desired packing to form a gas-tight point about same.

Carried by the baffles $c$ or other means forming the gas chambers at the top of the tank, are ordinary diaphragms $k-k'$ extending completely about each inner electrode so as to prevent the commingling of the gas bubbles liberated as a result of the decomposition of electrolyte.

As a result of the construction herein shown and described, the partitioning electrode has the current supplied thereto through terminal bars entirely independent of those supplying current to the tank $a$, and hence the resistance of the material of the tank is no factor in maintaining the proper potential throughout said partitioning electrode. When the partitioning electrode is in electrical connection with the tank, a small portion of this electrode may receive its charge through the tank, however.

By connecting the terminal bar or bars electrically and mechanically with the tank in the manner described, said terminal bars will act somewhat as a feeder, or feeders, with relation to the tank itself, which condition will also prevail if the partitioning electrode is in electrical connection with the tank, with this distinction that the terminal bars $f$ will then act in the nature of feeder lines with relation to both the tank and the partitioning electrode.

Along opposite sides of the tank $a$ are strips $m$ having relatively larger cross-sectional area than the wall of the tank, each of said strips having electrically and mechanically connected therewith a terminal bar or bars $n$, thus delivering current to the tank intermediate the top and bottom thereof at a plurality of points in a manner to minimize the resistance of the material of the tank and ensuring substantial uniformity in the distribution of the current throughout the operative area of said tank.

In this manner all of the elements in the tank are so constructed as to permit the utilization of a high amperage current with substantially no voltage drop as compared with the increased amperage, and overheating of the cell is prevented.

It is apparent that in a cell embodying my invention, the number of partitioning electrodes may be increased by multiplying the number of units in the cell, there being added one inner electrode to each partition, and that this multiplication of units will not increase the resistance of the cell or cause a voltage drop, except in direct proportion with the number of units added.

The added weight of cells due to such multiplication of the units, makes it desirable in most instances to employ a dual unit cell.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. An electrolytic cell embodying therein a container or tank for the electrolyte forming an electrode, closure means for the top of said tank, a partitioning electrode dividing said tank into two communicating electrolyte compartments, said tank and said electrode being of the same polarity, independent terminal bars carried by said tank and said partitioning electrode, inner electrodes of opposite polarity to said tank and said partitioning electrode arranged upon opposite sides of said partitioning electrode and between same and the wall of said tank, means co-operating with said closure means for preventing the commingling of gases adjacent the top of the cell, and diaphragms extending from said last named means within said compartment and about each of said inner electrodes.

2. An electrolytic cell embodying therein a container or tank for the electrolyte forming an electrode, closure means for the top of said tank, a partitioning electrode dividing said tank into two communicating electrolyte compartments, said tank and said electrode being of the same polarity, independent terminal bars carried by said tank and said partioning electrode, inner electrodes of opposite polarity to said tank and said partitioning electrode arranged upon opposite sides of said partitioning electrode and between same and the wall of said tank, terminal bars for said inner electrodes, means co-operating with said closure means for preventing the commingling of gases adjacent the top of the cell, and diaphragms extending from said last named means within said compartment and about each of said inner electrodes, the terminal bar for said partitioning electrode projecting through and beyond the wall of said tank, and a liquid-tight joint being formed between said bar and said wall, and said inner electrode terminal bars projecting through and beyond said closure means, and a gas-tight joint being formed about said bars, whereby short-circuiting of the cell through the cover is prevented.

3. An electrolytic cell embodying therein a container or tank for the electrolyte forming an electrode, closure means for the top of said tank, a partitioning electrode dividing said tank into two communicating electrolyte compartments, said tank and said electrode being of the same polarity, independent terminal bars carried by said tank and said partitioning electrode, the terminal bar of said partitioning electrode being mechanically and electrically connected therewith at a point or points well within the edges thereof, inner electrodes of opposite polarity to said tank and said partitioning electrode arranged upon opposite sides of said partitioning electrode and between same and the wall of said tank, means co-operating with said closure means for preventing the commingling of gases adjacent the top of the cell, and diaphragms extending from said last named means within said compartment and about each of said inner electrodes.

4. An electrolytic cell embodying therein a container or tank for the electrolyte forming an electrode, closure means for the top of said tank, a partitioning electrode dividing said tank into two communicating electrolyte compartments, said tank and said electrode being of the same polarity, independent terminal bars carried by said tank and said partitioning electrode, the terminal bar of said partitioning electrode being mechanically and electrically connected therewith at a point or points well within the edges thereof, inner electrodes of opposite polarity to said tank and said partitioning electrode arranged upon opposite sides of said partitioning electrode and between same and the wall of said tank, terminal bars for said inner electrodes, said terminal bars for said inner electrodes being electrically and mechanically connected therewith at a point or points well within the edges of the electrodes, means co-operating with said closure means for preventing the commingling of gases adjacent the top of the cell, and diaphragms extending from said last named means within said compartment and about each of said inner electrodes, the terminal bar for said partitioning electrode projecting through and beyond the wall of said tank, and a liquid-tight joint being formed between said bar and said wall, and said inner electrode terminal bars projecting through and beyond said closure means, and a gas-tight joint being formed about said bars, whereby short-circuiting of the cell through the cover is prevented.

5. An electrolytic cell embodying therein a container or tank for the electrolyte forming an electrode, closure means for the top of said tank, a partitioning electrode dividing said tank into two communicating electrolyte compartments, consisting of a plurality of parallel plates of small cross-sectional area and a terminal bar extending between said plates and mechanically and electrically connected therewith at a point or points well within the edges thereof, a terminal bar mechanically and electrically connected with said tank intermediate the top and bottom thereof, said tank and said electrode being of the same polarity, inner electrodes of opposite polarity to said tank and said partitioning electrode arranged upon opposite sides of said partitioning electrode and between same and the wall of said tank, means co-operating with said closure means for preventing the commingling of gases adjacent the top of the cell, and diaphragms extending from said last named means within said compartment and about each of said inner electrodes.

6. An electrolytic cell embodying therein a container or tank for the electrolyte forming an electrode, closure means for the top of said tank, a partitioning electrode dividing said tank into two communicating electrolyte compartments, consisting of a plurality of parallel plates of small cross-sectional area and a terminal bar extending between said plates and mechanically and electrically connected therewith at a point or points well within the edges thereof, a terminal bar mechanically and electrically connected with said tank intermediate the top and bottom thereof, said tank and said electrode being of the same polarity, inner electrodes of opposite polarity to said tank and said partitioning electrode and arranged upon opposite sides of said partitioning electrode and between same and the wall of said tank, terminal bars for said inner electrodes, means co-operating with said closure means for preventing the commingling of gases adjacent the top of the cell, and diaphragms extending from said last named means within said compartment and about each of said inner electrodes, the terminal bar for said partitioning electrode projecting through and beyond the wall of said tank, and a liquid-tight joint being formed between said bar and said wall, and said inner electrode terminal bars projecting through and beyond said closure means, and a gas-tight joint being formed about said bars, whereby short-circuiting of the cell through the cover is prevented.

7. An electrolytic cell embodying therein a container or tank for the electrolyte forming an electrode, closure means for the top of said tank, a partitioning electrode dividing said tank into two communicating electrolyte compartments, consisting of a plurality of parallel plates of small cross-sectional area and a terminal bar extending between said plates and mechanically and electrically connected therewith at a point or points well within the edges thereof, a terminal bar mechanically and electrically connected with said tank intermediate the top and bottom thereof, said tank and said electrode being of the same polarity, inner electrodes of opposite polarity to said tank and said partitioning electrode arranged upon opposite sides of said partitioning electrode and between same and the wall of said tank, each of said inner electrodes consisting of plates of small cross-sectional area and a terminal bar extending between said plates and mechanically and electrically connected therewith at a point or points well within the edges thereof, means co-operating with said closure means for preventing the commingling of gases adjacent the top of the cell, and diaphragms extending from said last named means within said compartment and about each of said inner electrodes.

8. An electrolytic cell embodying therein a container or tank for the electrolyte forming an electrode, closure means for the top of said tank, a partitioning electrode dividing said tank into two communicating electrolyte compartments, consisting of a plurality of parallel plates of small cross-sectional area and a terminal bar extending between said plates and mechanically and electrically connected therewith at a point or points well within the edges thereof, conductor strips mechanically and electrically connected with said tank intermediate the top and bottom along opposite sides thereof, a plurality of terminal bars connected with said strips, said tank and said electrode being of the same polarity, inner electrodes of opposite polarity to said tank and said partitioning electrode and arranged upon opposite sides of said partitioning electrode and between same and the wall of said tank, terminal bars for said inner electrodes, means co-operating with said closure means for preventing the commingling of gases adjacent the top of the cell, and diaphragms extending from said last named means within said compartment and about each of said inner electrodes, the terminal bar for said partitioning electrode projecting through and beyond the wall of said tank, and a liquid-tight joint being formed between said bar and said wall, and said inner electrode terminal bars projecting through and beyond said closure means, and a gas-tight joint being formed about said bars, whereby short-circuiting of the cell through the cover is prevented.

9. An electrolytic cell embodying therein a container or tank for the electrolyte forming an electrode, closure means for the top of said tank, a partitioning electrode dividing said tank into two communicating electrolyte compartments, consisting of a plurality of parallel plates of small cross-sectional area and a terminal bar extending between said plates and mechanically and electrically connected therewith at a point or points well within the edges thereof, conductor strips mechanically and electrically connected with said tank intermediate the top and bottom along opposite sides thereof, a plurality of terminal bars connected with said strips, said tank and said electrode being of the same polarity, inner electrodes of opposite polarity to said tank and said partitioning electrode arranged upon opposite sides of said partitioning electrode and between same and the wall of said tank, each of said inner electrodes consisting of plates of small cross-sectional area and a terminal bar extending between said plates and mechanically and electrically connected therewith at a point or points well within the edges thereof, means co-operating with said closure means for preventing the commingling of gases adjacent the top of the cell, and diaphragms extending from said last named means within said compartment and about each of said inner electrodes, the various terminal bars all being of relatively greater cross-sectional area than the electrodes with which they are electrically connected.

In witness whereof I have hereunto affixed my signature this 1st day of October, 1921.

ISAAC H. LEVIN.